US012749048B2

(12) United States Patent
Fox et al.

(10) Patent No.: US 12,749,048 B2
(45) Date of Patent: Sep. 29, 2026

(54) PRODUCT DEMAND USING FOOD RECIPE DATA

(71) Applicant: INTERNATIONAL BUSINESS MACHINES CORPORATION, Armonk, NY (US)

(72) Inventors: Jeremy R. Fox, Georgetown, TX (US); Shikhar Kwatra, San Jose, CA (US); Smitkumar Narotambhai Marvaniya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 17/935,230

(22) Filed: Sep. 26, 2022

(65) Prior Publication Data

US 2024/0104625 A1 Mar. 28, 2024

(51) Int. Cl.
*G06Q 10/087* (2023.01)
*G06Q 30/0601* (2023.01)

(52) U.S. Cl.
CPC ................. *G06Q 10/08774* (2025.08); *G06Q 30/0633* (2013.01)

(58) Field of Classification Search
CPC ......... G06Q 10/08774; G06Q 30/0633; G06Q 30/0635; G06Q 30/0631
USPC ........................................................... 705/28
See application file for complete search history.

(56) References Cited

U.S. PATENT DOCUMENTS 7,698,170 B1 4/2010 Darr
8,639,567 B2 1/2014 Winters
9,552,593 B2 1/2017 Abad Fernandez
2007/0005437 A1 1/2007 Stoppelman
2008/0249865 A1 10/2008 Angell
2013/0080289 A1 3/2013 Roy
2013/0124361 A1 5/2013 Bryson
2013/0132179 A1 5/2013 Wu
2016/0171586 A1 6/2016 Jung
(Continued)

FOREIGN PATENT DOCUMENTS

IN 202121045940 A 5/2022

OTHER PUBLICATIONS

Abbu, Haroon et al. The Case of Digital Transformation in Grocery Business: A Conceptual Model of Digital Grocery Ecosystem. 2021 IEEE International Conference on Engineering, Technology, and Innovation, 2021. (Year: 2021).*

(Continued)

*Primary Examiner* — Fawaad Haider
(74) *Attorney, Agent, or Firm* — Andre L. Adkins

(57) ABSTRACT

Techniques are described with respect to a system, method, and computer product for improving product demand. An associated method includes generating a food profile based on a food inventory of a user the food inventory available to a computing device in a computer-accessible form; and identifying at least one food recipe based on the food profile, the food recipe available in a computer-accessible form. The method further includes determining a plurality of food items associated with the food inventory; identifying one or more absent food items associated with the at least one food recipe from the plurality of food items, the one or more absent food items being absent from the food inventory; and communicating to the user that the one or more absent food items are absent from the food inventory.

20 Claims, 8 Drawing Sheets

(56) References Cited

U.S. PATENT DOCUMENTS

| | | | | |
|---|---|---|---|---|
| 2017/0316489 | A1* | 11/2017 | Sampara ............ | G06Q 30/0633 |
| 2019/0304588 | A1 | 10/2019 | Ren | |
| 2020/0302377 | A1* | 9/2020 | Danducci ............... | G01N 33/02 |

OTHER PUBLICATIONS

Chen, et al., "OLS Ontology Search, Food Ontology," EMBL-EBI, [accessed Sep. 22, 2022], 3 pgs., Retrieved from the Internet: <https://www.ebi.ac.uk/ols/ontologies/foodon>.

Disclosed Anonymously, "Cognitive Smart Shopping Cart for Real-Time Shopping Advice," IP.com Prior Art Database Technical Disclosure, IPCOM000263776D, Oct. 2, 2020, 5 pgs.

Disclosed Anonymously, "Method and System for Recipe Based Food Management," IP.com Prior Art Database Technical Disclosure, IPCOM000258637D, May 31, 2019, 3 pgs.

Disclosed Anonymously, "Method and System for Utilizing a Cognitive Smart Shopping Basket (Cart) as a Real-Time Shopping Advisory," IP.com Prior Art Database Technical Disclosure, IPCOM000258599D, May 28, 2019, 5 pgs.

Esha Research, "Recipe and Ingredient Database Download Files," Esha.com, [accessed Sep. 22, 2022], 5 pgs., Retrieved from the Internet: <https://esha.com/resources/additional-databases/>.

Guidotti et al., "Personalized Market Basket Prediction with Temporal Annotated Recurring Sequences," IEEE Transactions on Knowledge and Data Engineering, vol. 31, No. 11, IEEE, Nov. 2019, pp. 2151-2163.

IBM, "IBM Food Trust: A New Era in the World's Food Supply," IBM.com, [accessed Aug. 18, 22], 12 pgs., Retrieved from the Internet: <https://www.ibm.com/blockchain/solutions/food-trust>.

Kaggle, "Recipe Ingredients Dataset," Kaggle.com, Updated 6 Years Ago, [accessed Sep. 22, 2022], 2 pgs., Retrieved from the Internet: <https://www.kaggle.com/datasets/kaggle/recipe-ingredients-dataset>.

Mell et al., "The NIST Definition of Cloud Computing", National Institute of Standards and Technology, Special Publication 800-145, Sep. 2011, pp. 1-7.

Pogorelc, "Retail Food Waste Solutions Represent $18B Opportunity," New Hope Network, Jan. 31, 2018, [accessed Sep. 22, 2022], 3 pgs., Retrieved from the Internet: <https://www.newhope.com/business-resources/retail-food-waste-solutions-represent-18b-opportunity>.

Sengupta, "How Much Food Do We Waste? Probably More Than You Think," New York Times, Dec. 12, 2017, [accessed Aug. 18, 2022], 2 pgs., Retrieved from the Internet: <https://www.nytimes.com/2017/12/12/climate/food-waste-emissions.html>.

Supercook, "SuperCook—Zero Waste Recipe Generator," Supercook.com, [accessed Sep. 22, 2022], 1 pg., Retrieved from the Internet: <https://www.supercook.com/#/desktop>.

* cited by examiner

PRODUCT DEMAND USING FOOD RECIPE DATA

BACKGROUND

The present invention relates generally to optimizing food personalization and reducing food waste, and more specifically, to optimizing food personalization and reducing food waste by using a computing device executing a machine learning model to ascertain food product information based on food recipes.

A significant amount of food produced for human consumption is wasted on a yearly basis. A large factor that contributes to this waste is the expiration of food within households, in which food items are purchased by consumers, never used or finished, and must subsequently be discarded due to the expiration of the applicable food product.

In particular, a problem associated with optimizing food personalization is due to data processing limitations associated with the inability to personalize food recipe preferences and food product estimations based on the inventory of users, which causes over expenditure of food products which directly impacts food waste. For example, processing data to ascertain food inventories at a household level has a plethora of limitations such as the lack of ability to ascertain food inventory and food product expiration dates in real-time. Furthermore, overestimation of quantities of food products within inventories and predictions made based on these inaccurate quantities exacerbate the global food waste dilemma.

SUMMARY

Additional aspects and/or advantages will be set forth in part in the description which follows and, in part, will be apparent from the description, or may be learned by practice of the invention.

According to an embodiment, a computer-implemented method for optimizing food personalization includes generating, by a computing device, a food profile based on a food inventory of a user the food inventory available to the computing device in a computer-accessible form; identifying, by the computing device, at least one food recipe based on the food profile, the food recipe available in a computer-accessible form; determining, by the computing device, a plurality of food items associated with the food inventory; identifying, by the computing device, one or more absent food items associated with the at least one food recipe from the plurality of food items, the one or more absent food items being absent from the food inventory; and communicating, by the computing device, to the user that the one or more absent food items are absent from the food inventory.

According to another embodiment, a computer system for optimizing food personalization, the computer system including one or more processors, one or more computer-readable memories, and program instructions stored on at least one of the one or more computer-readable memories for execution by at least one of the one or more processors to cause the computer system to generate a food profile based on a food inventory of a user the food inventory available to a computing device in a computer-accessible form; identify at least one food recipe based on the food profile, the food recipe available in a computer-accessible form; determine a plurality of food items associated with the food inventory; identify one or more absent food items associated with the at least one food recipe from the plurality of food items, the one or more absent food items being absent from the food inventory; and communicate to the user that the one or more absent food items are absent from the food inventory.

According to another embodiment, a computer program product for optimizing food personalization, the computer program product comprising a computer readable storage medium having program instructions embodied therewith, wherein the computer readable storage medium is not a transitory signal per se, the program instructions being executable by a processor to cause the processor to perform a method including generating a food profile based on a food inventory of a user the food inventory available to a computing device in a computer-accessible form; identifying at least one food recipe based on the food profile, the food recipe available in a computer-accessible form; determining a plurality of food items associated with the food inventory; identifying one or more absent food items associated with the at least one food recipe from the plurality of food items, the one or more absent food items being absent from the food inventory; and communicating to the user that the one or more absent food items are absent from the food inventory.

With this embodiment, determining the plurality of food items includes invoking, by the computing device, a machine learning model, the machine learning model outputting a food product quantity and a duration of usage for one or more items of the food inventory.

With this embodiment, predicting a desirable quantity of the one or more absent food items, the predicting the desirable quantity including generating a recipe ontology based on the at least one food recipe; determining a quantity of one or more items in the food inventory; correlating the recipe ontology with the quantity of the one or more items in the food inventory to predict the desirable quantity for the one or more absent food items; and communicating to the user the desirable quantity of the one or more absent food items.

With this embodiment, the predicting the desirable quantity of the one or more absent food items includes predicting a number of times the at least one food recipe has been cooked by the user within a time interval, the predicting the number of times being based on the determined quantity of the one or more items in the food inventory; predicting based on the predicted number of times the at least one food recipe has been cooked and on an acquisition history of the user, an amount of the one or more absent food items that are present in the food inventory for the user; and reducing the desirable quantity based on the predicted amount of the amount of the one or more absent food items that are present in the food inventory for the user.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
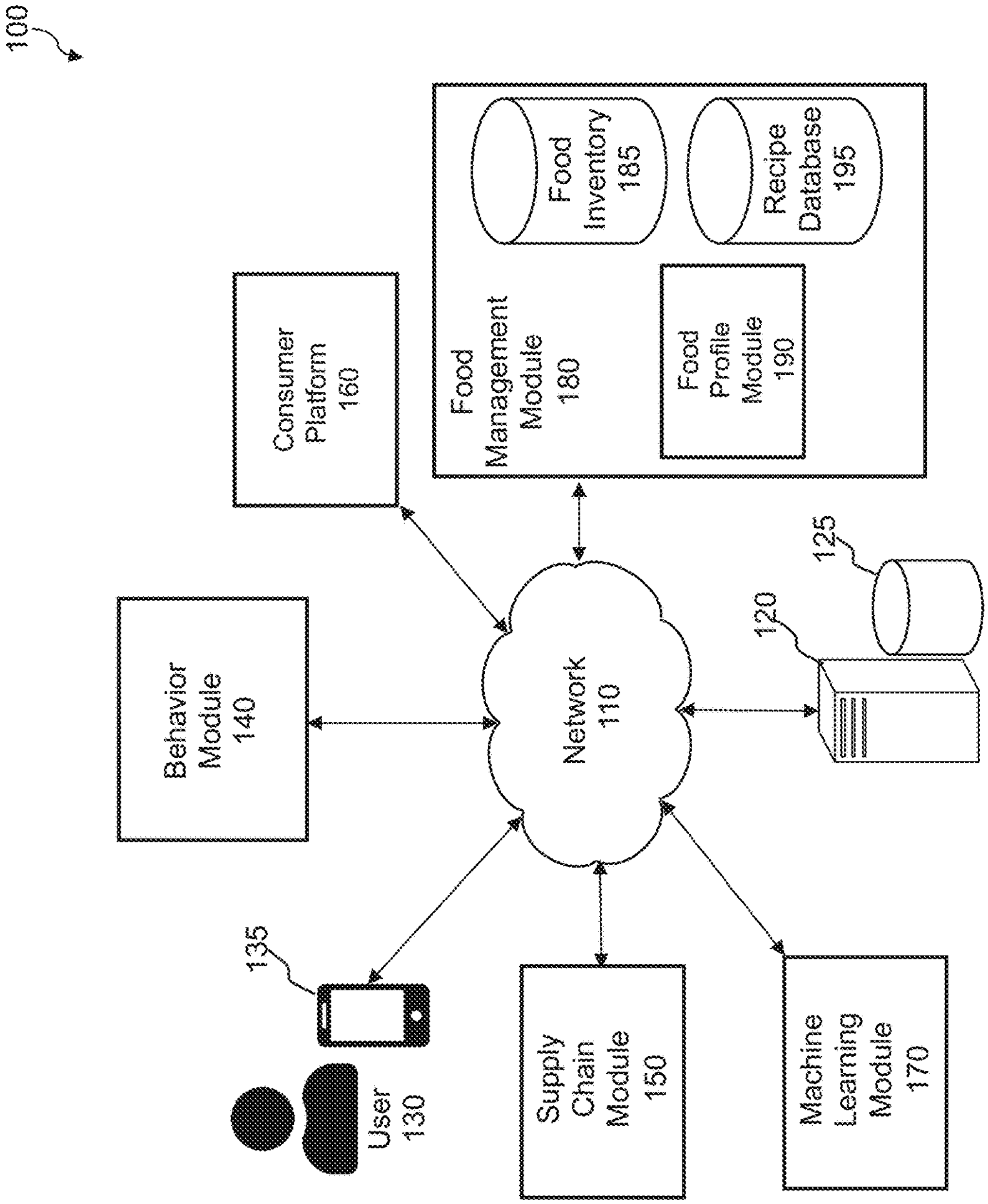
FIG. 1 illustrates an exemplary network diagram depicting a network environment, according to an exemplary embodiment of the invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

As used herein, the term "recipe" refers to a listing of food products that calls for one or more type of food products to be utilized in a manner in which to create a combined food product, based upon a set of instructions. In the context of this invention disclosure, embodiments disclosed herein rely upon a recipe which is available in a computerized form such as from an internet web page, electronic repository of recipes, electronic documents, etc.

As used herein, the term "product" refers to food, sauces, condiments, liquids, or any combination thereof that is grown, processed, extracted, fermented, cooked or subject to any other applicable food preparation technique known to those of ordinary skill in the art.

The following described exemplary embodiments provide a method, computer system, and computer program product for optimizing food personalization using food recipe data. About one-third of the food produced in the world for human consumption every year is lost or wasted. Particularly in the United States and other industrialized countries, a significant portion of the waste is attributed to the expiration of food items within households. For example, individuals typically purchase food items with the intention of preparing a specific recipe; however, the more frequently a recipe is prepared the higher the likelihood that ingredients of the recipe need to be replenished. Although knowledge of the quantity of an ingredient within a household food inventory is important, it would be helpful to be able to utilize various data such as a user's sale history relating food items, favorite recipes, supply chain information, etc. in order to ascertain a duration of usage for food items along with how much and how frequently a food product should be purchased for food waste reduction purposes. The present embodiments have the capacity to utilize a food profile generated based on a user and recipe data in order to ascertain food product information (e.g. quantity, usage, shortages, etc.). Furthermore, the present embodiments utilize artificial intelligence and machine learning technologies to derive user food inventory information from recipes associated with the user pertaining to food items of the recipes, such as food items the user is missing, frequency that recipes are being cooked, quantities of food items when last purchased by the user, consumption reduction estimations, etc. In addition, the results of processes of the present embodiments may be utilized by supply chain systems in order to optimize food waste reduction (e.g. product item stock predictions, etc.).

FIG. 1 shows a network environment 100 for a system for optimizing food personalization, according to an exemplary embodiment. Environment 100 includes a server 120 communicatively coupled to a server database 125, a user 130 associated with a computing device 135, a user behavior module 140, a supply chain module 150, a consumer platform 160, a machine learning module 170, a food management module 180 including a food inventory 185 associated with user 130, a recipe database 195 associated with user 130, and food profile module 190, each of which are communicatively coupled over network 110. FIG. 1 provides only an illustration of implementation and does not imply any limitations regarding the environments in which different embodiments may be implemented. Modifications to environment 100 may be made by those skilled in the art without departing from the scope of the invention as recited by the claims. Environment 100 is a network of computers in which the illustrative embodiments may be implemented, and network 110 is the medium used to provide communications links between various devices and computers connected together within environment 100. Network 110 may include connections, such as wire, wireless communication links, or fiber optic cables. Network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. It should be appreciated that FIG. 1 provides only an illustration of one implementation and does not imply any limitations with regard to the environments in which different embodiments may be implemented. Many modifications to the depicted environments may be made based on design and implementation requirements. For example, user behavior module 140, supply chain module 150, consumer platform 160, a machine learning module 170, and food management module 180 may be respective components of server 120. Computing device 135 may include, without limitation, smartphones, tablet computers, laptop computers, desktop computers, wearable device, computer-mediated reality (CMR) devices/virtual reality devices, and/or other applicable hardware/software configured to support network access.

User 130 may be an individual, family, group, and/or entity (e.g. restaurant, franchise, large operation, etc.). User behavior module 140 is configured to utilize data obtained from data sources such as but not limited to internet browsers, public websites, social media platforms, monitoring systems, wearable devices affixed to user 130, consumer platform 160, or any other crawlable data source known to those of ordinary skill in the art. In some embodiments, user behavior module 140 handles activity data associated with user 130 and the aforementioned data sources including internet browsing activity (e.g. patterns, habits, etc.), social media activity (e.g. likes, posts, shares, etc.), audio inputs/sentiments of user 130 collected by monitoring systems transcribed to text, purchase history (e.g. user sales data, etc.), etc. subject to the consent provided by user 130. Consent provided by user 130 must be affirmatively provided, such as by user clicking "yes" on a pop-up or in an equivalent means. User behavior module 140 may further acquire and analyze biological data associated with user 130 such as allergies, intolerances, etc. User behavior module 140 may utilize machine learning module 170 to train or tune one or more machine learning models, and provide the ability to have a better understanding of the food or dietary preferences, habits, etc. of user 130. For example, if data collected from the various data sources, such as a social media platforms indicate that user 130 has an inclination towards desserts based on likes, comments, and shares on social media contents including desserts then user behavior module 140 may transmit this data to food management module 180 for processing.

Supply chain module 150 is one or more supply chain systems relating to food items. One of the purposes of supply chain module 150 receiving data derived from food management module 180 is to allow supply chain module 150 to take this data into account in addition to food product opinions, sentiments, emotions, etc. associated with user 130 in order to optimize supply chains associated with food items. In particular, one of the goals of supply chain module 150 is to utilize the data derived from food management module 180 to reduce the waste of food items. As described throughout, outputs of machine learning models operated by machine learning module 170 based on data derived from food management module 180 are utilized by supply chain module 150 to optimize supply chains associated with food items. For example, recipes stored in recipe database 195 are correlated to food inventory 185 accounting for factors ascertained from the aforementioned modules in order to not only ascertain which food items user 130 is currently out of, but also assist the machine learning models (e.g. estimation models) with outputting the favorite recipes of user 130 (Ri), the quantity (Qi) and duration of use (Di) of food items of the recipes, the quantity of food items when most recently purchased by user 130 (Cqi), quantity reduction of Cqi, etc.

Consumer platform 160 is any applicable vendor and/or retailer configured to provide food items physically and/or virtually including but not limited to supermarkets, delivery services, or any other applicable retailers known to those of ordinary skill in the art. In some embodiments, food items included in shopping carts, wish-lists, etc. associated with user 130 may be included in food inventory 185; however, food inventory 185 may also account for food items detected via internet of things (IOT) sensors, RFID tags, beacons, or any other applicable tracking mechanisms known to those of ordinary skill in the art.

Machine learning module 170 is configured to use one or more heuristics and/or machine learning models for performing one or more of the various aspects as described herein. In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. In some embodiments, machine learning module 170 operates one or more machine learning models in which machine learning module 170 trains or tunes the one or more machine learning models with training datasets including training data associated with user 130 including but not limited to previous grocery lists, previous food inventories of user 130, previous recipes or food products interacted with by user 130 on applicable social media platforms (e.g. recipes or food items that user 130 has liked, posted, shared, etc.), and/or derivatives thereof. Theses one or more machine learning models generate predictions that may be used to optimize outputs of future iterations of machine learning models that generate outputs pertaining to food product quantity and food product duration of usage within food inventory 185, favorite or likely to be used recipes within recipe database 195, food products likely to not be included in food inventory 185 by user 130, one or more elements of food profiles generated specific to user 130, or any other applicable food product data and/or recipe data known to those of ordinary skill in the art.

Food management module 180 is configured to utilize data derived from the aforementioned modules in addition to food inventory 185 and recipe database 195 in order for food profile module 190 to generate a food profile specific to user 130. In some embodiments, the food profile is a representation of food inventory 185 along with predictions, estimations, and other applicable information associated with food items within inventory associated with user 130 such as, but not limited to food product sales activity, food preferences (e.g. preferred recipes, preferred ingredients, etc.), allergies/dietary restrictions, level of culinary skill, budget constraints, supply chain constraints, etc. In some embodiments, server 120 is configured to generate a centralized platform designed to serve as a mechanism for user 130 to view and modify components of the food profile via user interfaces presented to computing device 135. User 130 may input parameters (or the parameters can be extracted) to indicate, for example, if the user 130 is a vegetarian, a vegan, a pescetarian, etc., allergies of the user, favorite cuisines, cuisines disliked or disfavored, seasonal favorite foods (e.g. baked goods in winter and grilled foods in summer), past ratings and review of recipes to determine a likeness of the recipe, demographic information, any unstructured text message provided such as "I love to eat waffles for breakfast only with honey during weekends", or the like. In some embodiments, information associated with food items may be extracted from images acquired by computing device 135, such as images user 130 utilizes for social media posts, etc. User 130 may utilize the centralized platform to view components of the food profile, view metrics and analytics derived from the food profile, modify components of the food profile, etc. via user interfaces provided to computing device 135. For example, the centralized platform may provide user 130 with computer accessible mechanisms to view, add, modify, etc. the food profile, food inventory 185, and food recipes of recipe database 195 on computing device 135. Food management module 180 generates and manages food inventory 185, in which food inventory 185 lists food items in possession of user 130 (including food items that have been added to shopping carts) along with current quantity values associated with the food items. Food inventory 185, in an exemplary embodiment, may also be capable of providing expiration dates for particular food items in stock which may be helpful in promoting these particular items to shoppers before they expire. In alternative embodiments, food inventory 185 may be capable of instructing food management module 180 to re-order food items, through respective suppliers, that are expired, about to expire, or in high-demand by consumers.

In some embodiments, one or more web crawlers associated with server 120 crawl internet sources such as but not limited to news sources, blogs, image sharing/social media platforms, digital cookbooks, or any other applicable internet-based content including recipes in order to extract recipe data based on the user profile and transmits the recipe data to server 120 over network 110.

Figure 2:
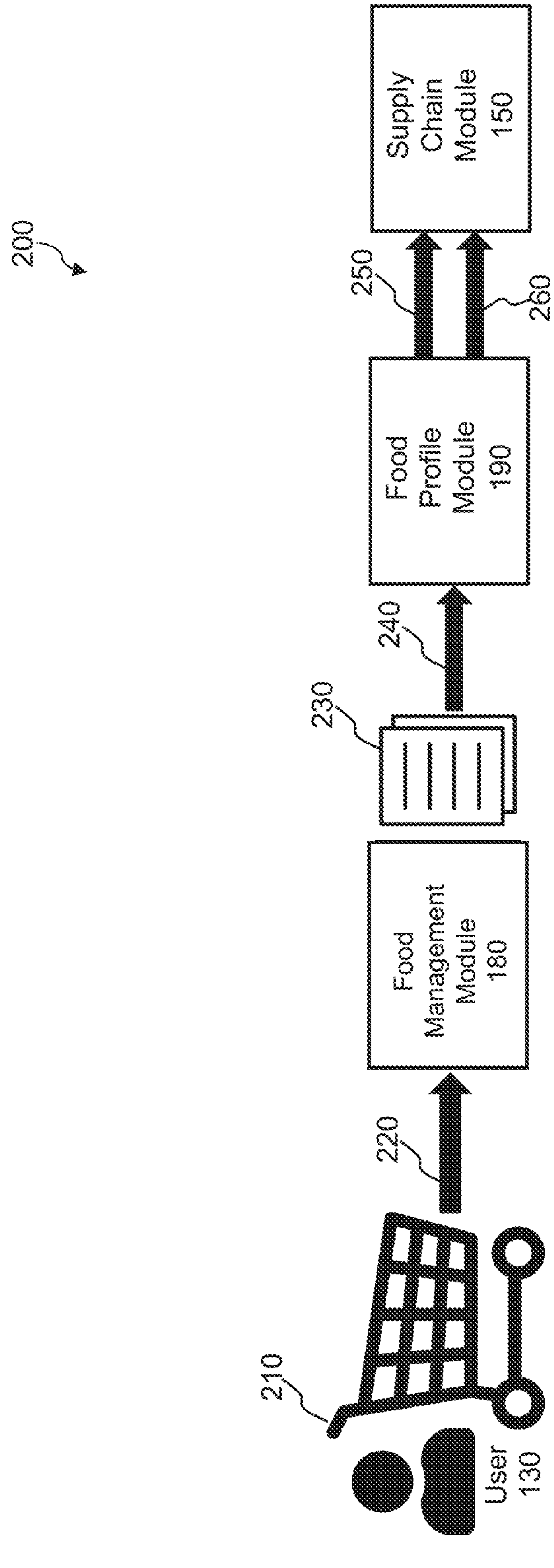
FIG. 2 depicts a data flow illustrating certain aspects of an embodiment of the present invention.

Referring now to FIG. 2, a data flow 200 associated with the system for optimizing food personalization is depicted, according to an exemplary embodiment. In some embodiments, user 130 adds food items to a shopping cart 210 (e.g. container, basket, cart, etc.) in which data derived from selected food items 220 is transmitted to food management module 180, which is continuously analyzing selected food items 220 in order to determine whether the food items are accounted for in food inventory 185. Shopping cart 210 may be a component of consumer platform 160 operating on computing device 135 or one or more physical shopping carts in which IOT enabled devices are designed to monitor, track, and analyze food items added to the one or more physical shopping carts (such as via an RFID tag, automatic scanning of bar codes, or an equivalent means). As described herein shopping cart 210 may include any sensors, scales, barcodes, or monitors configured to track food products. As user 130 is searching, reviewing, and selecting food items, user behavior module 140 is monitoring and analyzing the activities, patterns, etc. of user 130 with consumer platform 160 and the food items.

In some embodiments, current food items within shopping cart 210 and previous sales activity of user 130 derived from user behavior module 140 and/or consumer platform 160 are utilized by machine learning module 170 to infer a plurality of previously prepared recipes 230 of user 130 configured to be stored in recipe database 195. Food management module 180 may include a recipe analyzer that is an application or compilation of computer instructions for analyzing one or more recipes or the recipes. The recipe analyzer may be communicatively coupled to server 120 allowing user 130 to view derivatives of the recipe analyzer via the centralized platform. The recipe analyzer can be an ontology-based system, a natural language processing system, and/or a set of instructions for interfacing with such systems. The tracking of selected food items 220 indicates that selected food items 220 are depleted or in shortage within the household of user 130. For example, if user 130 adds cheese to shopping cart 210 then food management module 180 assumes that cheese is in shortage within the household. Food management module 180 may utilize machine learning module 170 to assist with generating a food ontology in which correlation between selected food items 220/the plurality of previously prepared recipes 230 and the food ontology results in a plurality of absent food items predictions 240 generated by machine learning module 170. Absent food items predictions 240 are representations of missing ingredients necessary to complete preparation of the plurality of previously prepared recipes 230 based upon food inventory 185.

Food management module 180 utilizes past purchase information associated with selected food items 220 derived from user behavior model 140 for machine learning module 170 to invoke machine learning models to ascertain a quantity (Qi) 250 and a duration of usage by user 130 (Di) 260 for each food item of selected food items 220. Qi 250 may be a predicted quantity, a desirable quantity (of user 130), and/or actual quantity. Returning to the previous cheese example, the indication that cheese is in shortage for user 130 and the past purchase information allows food management module 180 to ascertain that 500 grams of cheese a week ago, and infers that user 130 utilized 500 grams of cheese within the last week. In addition, the ascertaining of Qi and Di for selected food items 220 by food management module 180 allows food profile module 190 to generate a food profile associated with user 130 including at least a subset of the plurality of previously prepared recipes 230 that are deemed favorite recipes of user 130 (Ri) and stored in recipe database 195. In some embodiments, food profile module 190 leverages data derived from user behavior module 140, consumer platform 160, and other applicable external data sources in order to perform profiling of food items based on recipes. Leveraging data derived from external data sources such as food delivery apps allows food profile module 190 to generate the food profile in a manner in which the favorite recipes of user 130 are used to filter selected food items 220 based on selected food items 220 included in previously prepared recipes 230. For example, data derived from may be utilized in leveraging the food profile in order to filter out the favorite recipes of user 130 in relation to selected food items 220; thus, all recipes of previously prepared recipes 230 including cheese (derived from analyses of Instacart® delivery orders of user 130) are ascertained, and based on the Qi and Di of the cheese, food management module 180 determines that macaroni and cheese is a favorite recipe of user 130. Food profile module 190 continuously contributes favorite recipes of user 130 to the food profile based on data derived from user behavior module 140, consumer platform 160, and machine learning module 170 for purposes such as ascertaining the Qi and Di of selected food items 220 along with inventory information of food inventory 185. For example, it is possible for the favorite recipes of user 130 to change over a period of time and/or for user 130 to develop an allergy or intolerance to a particular type of food in which food profile module 190 is configured to automatically update the Qi and Di of selected food items 220, the Ri of user 130, and reflect said updates within the food profile.

It should be noted that the Qi 250 and Di 260 not only assist with the maintenance and optimization of food inventory 185, but also help facilitate estimations of quantities of food items correlated to food inventory 185 which may be utilized by supply chain module 150. For example, estimations pertaining to quantities of food items may be utilized supply chain module 150 to enable better inventory management at retailer/distribution stages in the food supply chain, and more importantly to assist in reducing food waste. In another example, Qi 250 and Di 260 may be utilized to identify food items that have a high likelihood of being wasted within supply chains by weighing Qi 250 and Di 260 in light of the expiration date and sales data associated with the food items.

Figure 3:
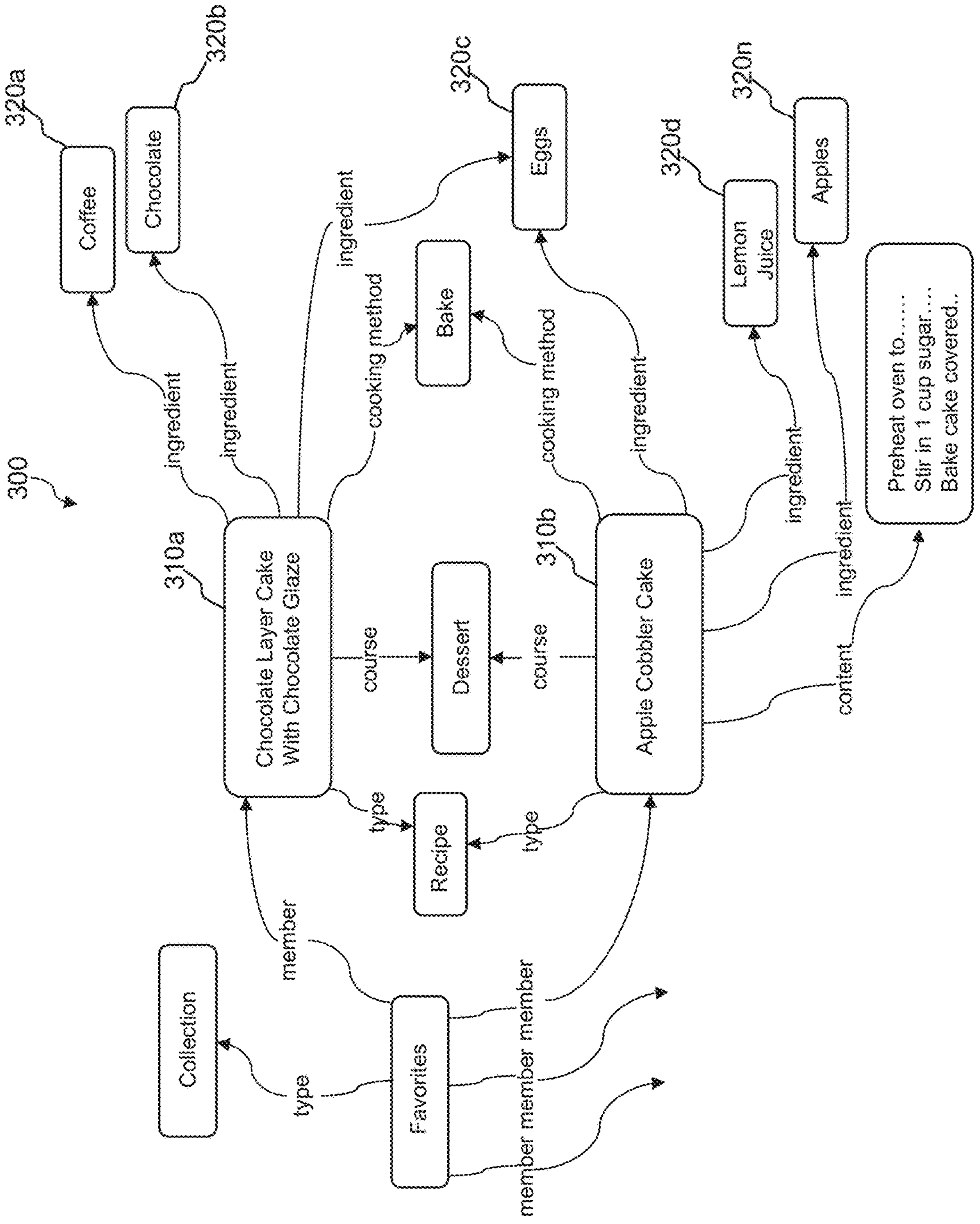
FIG. 3 depicts an exemplary food ontology illustrating certain aspects of an embodiment of the present invention.

Referring now to FIG. 3, a food ontology 300 is depicted, according to an exemplary embodiment. Food management module 180 analyzes the recipes within recipe database 195 to determine the food items/ingredients involved in the recipes (previously prepared recipes 230 and Ri). In some embodiments, this can also include analyzing steps and/or activities involved in preparing the ingredients. Analyzing the ingredients involved in the recipes involves using ontology building to construct food ontology 300 and other applicable graphs. As depicted, food ontology 300 includes food item nodes 310*a* & 310*b* correlated to food product nodes 320*a*, 320*b*, 320*c*, 320*d*, and 320*n*, in which a plurality of edges connect the aforementioned nodes. Food management module 180 crawls the recipe details and builds an ontology such that it can be easy for identifying recipe details including, but not limited to steps, ingredients, quantities of ingredients, classifications/collections, cooking methods, favorites, etc. For example, the ontology can help in identifying the required ingredients in each of the cooking steps of preparing a recipe. An ontology can further break down a recipe into one or more subcomponents or cooking steps and break that down into one or more ingredients or actions involved in cooking steps. Food management module 180 may utilize semantic similarity, syntactic analysis, ontological matching, and other natural language processing (NLP) techniques in order to identify recipe details.

In addition, correlation to ontology 300 results in food management module 180 being able to ascertain food items of recipes that are not included within selected food items 220 (hereinafter "absent food items"). For example in the instance in which an ascertained recipe within Ri included in the food profile is macaroni and cheese, upon user 130 adding cheese to shopping cart 210 the correlation of food inventory 185 to ontology 300 allows food management module 180 to ascertain that macaroni is an absent food product of Ri which has not been added to shopping cart 210. Machine learning module 170 generates, via one or more estimation models, an estimation of the Qi and Di of macaroni within food inventory 185, and transmits the estimation to server 120 and supply chain module 150. Absent food items also provide food management module 180 with insight regarding other applicable quantities of food items within food inventory 185. Machine learning module 170 may predict both the amount of times each recipe of Ri is cooked by user 130 based on the Qi of each of selected food items 220, and the average quantity of each food product required for one-time preparation of a recipe of Ri. For example, if food management module 180 determines that cheese sandwiches are within Ri and that user 130 needs 100 grams of cheese for one-time preparation, then machine learning module 170 infers user 130 utilized 500 grams of cheese since their last purchase of cheese (e.g. within a week) leading to the inference that user 130 cooked cheese sandwiches 5 times within the last week. Food management module 180 may utilize this information along with food ontology 300 to infer the quantity of remaining food items associated with a recipe. For example, food management module 180 may infer that bread, another possible ingredient of cheese sandwiches which is not included within selected food items 220, is in low stock within food inventory 185 based on the last time it was purchased by user 130 and number of times recipes involving bread (e.g. cheese sandwiches) have been prepared.

In some embodiments, food management module 180 is further configured to modify a recipe of previously prepared recipes 230 based on one or more of food inventory 185, Qi 250 and Di 260 of a food product, outputs of machine learning module 170, or any applicable data derived from food ontology 300. Food management module 180 may generate a modified recipe including, for example, a different amount of an applicable food product than the recipe, a different amount of time for at least one step of the recipe, and/or adding at least one ingredient to the recipe for taste enhancement. Food management module 180 may instruct machine learning module 170 to iterate in order to obtain data regarding a number of different types of food items and recipes to improve modifying the recipe.

Figure 4:
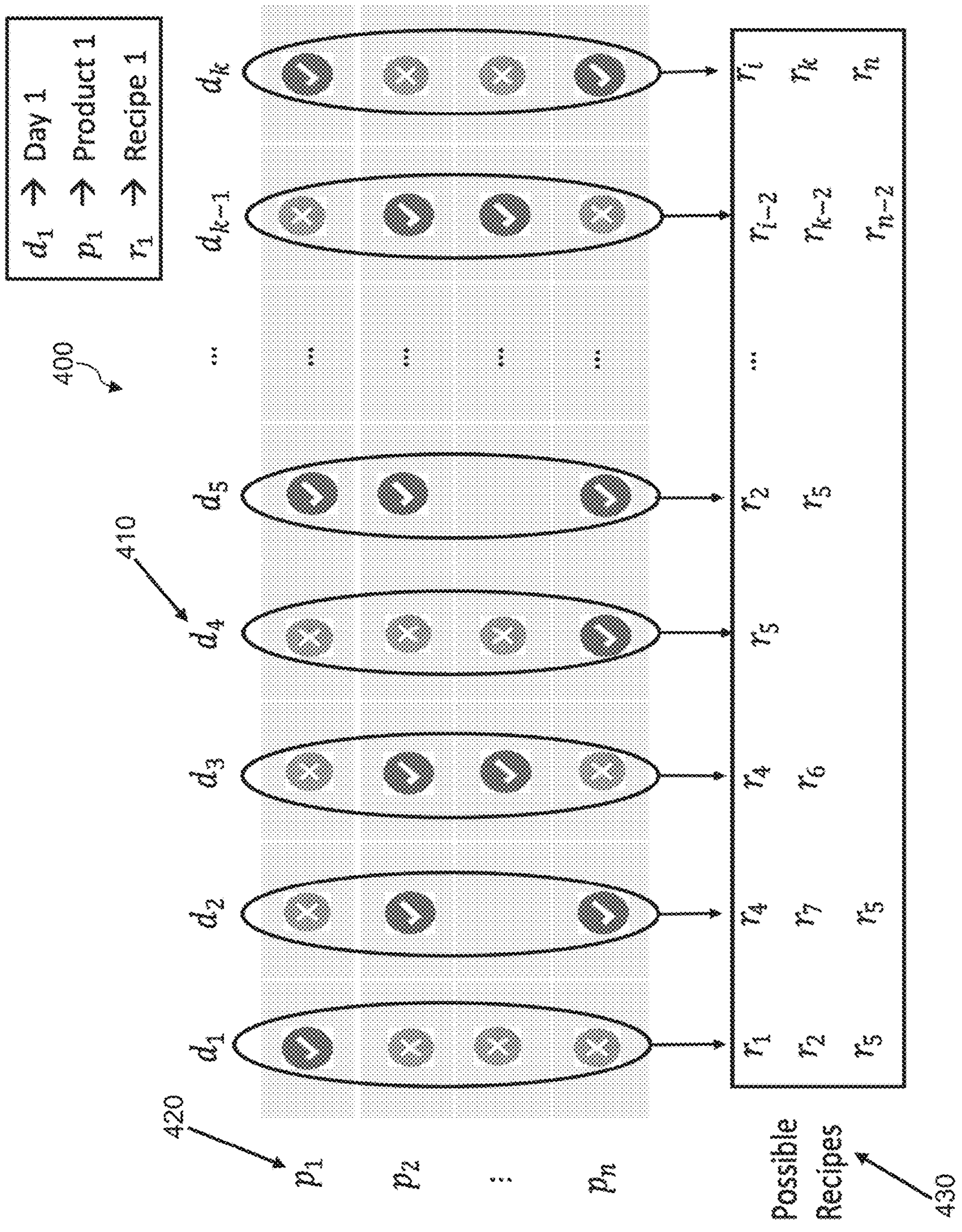
FIG. 4 depicts an exemplary mapping chart of food product availability to recipes, according to an exemplary embodiment.

Referring now to FIG. 4, mapping chart 400 of food product availability to recipes is depicted, according to exemplary embodiments. As described in more detail herein, food management module 180 provides mapping chart 400 which shows a mapping between availability 410 of food items 420 and possible recipes 430. While some embodiments are described herein in the context of a single graph, these embodiments and others apply to multiple graphs. For example, food management module 180 may provide different charts for different time intervals, where each chart shows a mapping between different food items and recipes. It should be noted that the mapping of food product availability (e.g. presence in the food inventory) to recipes is a result of the inferences rendered by food management module 180. For example in the instance where $p_1$ is bread, $p_2$ is cheese, and $p_n$ is butter, the alignment of the aforementioned food items to recipes $r_2$ and $r_5$ (grilled cheese sandwich and cheesy garlic bread, respectively) does not occur until $d_5$ (day 5) based on Qi 250 and Di 260 of each of food items 420.

In some embodiments, the mapping of availability of food items 420 to possible recipes 430 is based on one or more results of co-occurrence of prediction models operated by machine learning module 170. For example, training data including past food product details of food items 420, data derived from the food profile and food inventory 185, and user preferences of user 130 are used to train the prediction models in order to ascertain patterns of usage of food items 420 in addition to predicted requirements of food items (e.g. specific food product needing to be replenished by a certain time period). The training data may further include external event-related data associated with nearby external events, e.g. festivals, in order to account for variances of availability of food items. For example, a nearby carnival may be going on which directly impacts the demand and availability of a food product such as corn within the area. The generated predictions may account for such impact of availability. In some embodiments, the outputs of the prediction models are product availability metrics for each of food items 420, which may be used to measure the number of days of availability for each of food items 420. Co-occurrence of prediction models may influence the one more machine learning models to output the identified days of availability for each product based on user's purchase history associated with consumer platform 160.

In some embodiments, food management module 180 is further configured to generate a likeliness index associated with user 130 for possible recipes 430 by utilizing machine learning module 170, such as probability as to user 130 preferring the recipe or utilizing the recipe. Machine learning module 170 outputs the likeliness index based on one or more of past purchase information associated with food items 420 derived from behavior module 140 or consumer platform 160, data derived from recipes, festival related data, and other applicable data associated with user 130. Food management module 180 estimates shortage of a food product by tracking the past purchase information of the food product in order to ascertain the Cqi of said food product. Food management module 180 further estimates the quantity reduction of the Cqi based on the number of times recipes have been prepared by user 130 in order for food management module 180 to ascertain the current quantity of the food product within food inventory 185. In addition, the Cqi may be utilized to reduce the quantity of a food product that user 130 purchases over time. For example, the Cqi may be utilized in order to reduce the amount of cheese user 130 is purchasing weekly in order to reduce the quantity on a week to week basis resulting in the amount of cheese discarded by user 130 to be reduced overall.

Figure 5:
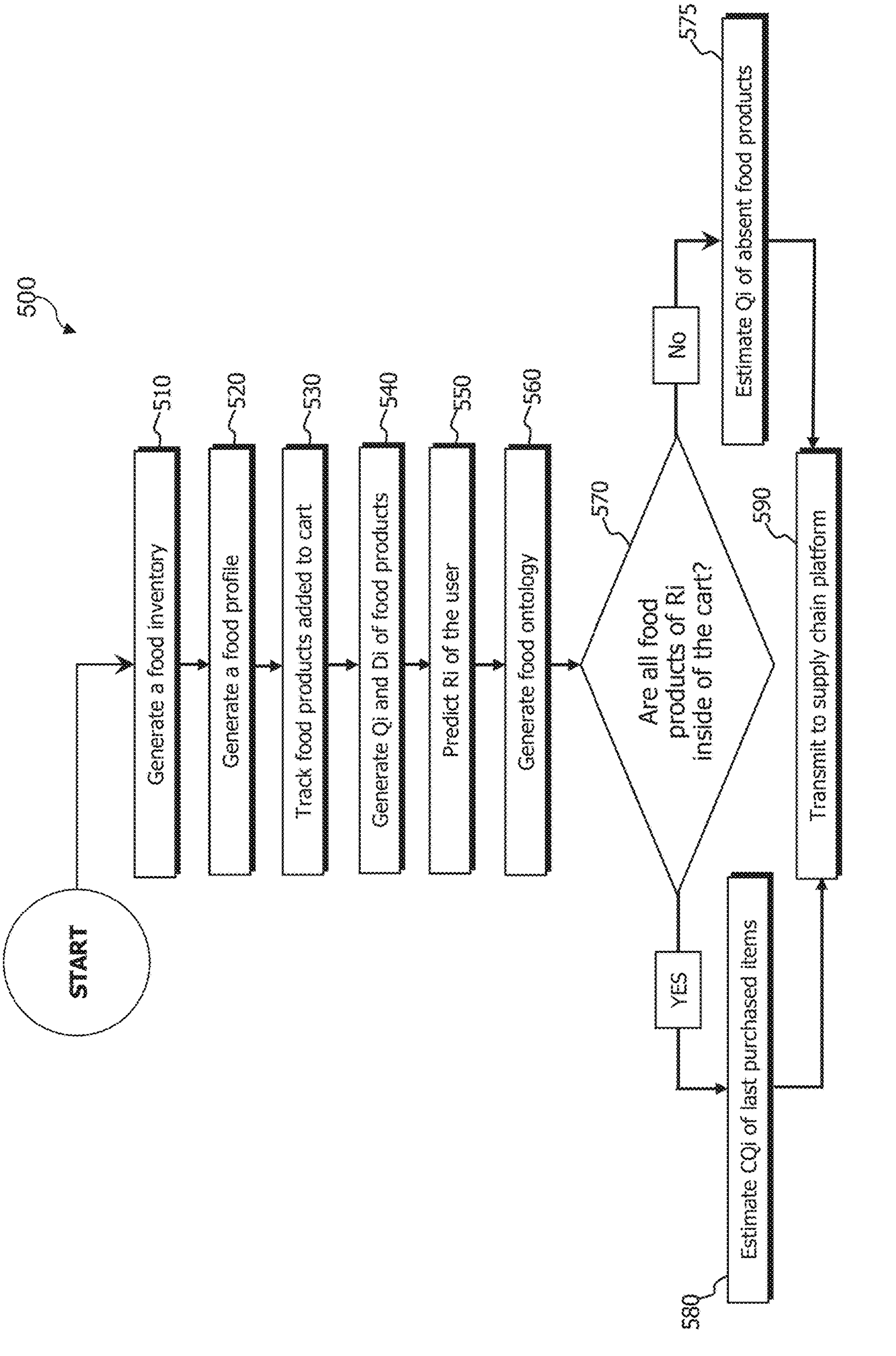
FIG. 5 illustrates a flowchart depicting a method for improving product demand, according to at least one embodiment.

With the foregoing overview of the example architecture, it may be helpful now to consider a high-level discussion of an example process. FIG. 5 depicts a flowchart illustrating a computer-implemented process 500 for improving product demand, consistent with an illustrative embodiment, where the process is implemented in the system of FIG. 1, in accordance with embodiments of the present invention. Process 500 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 510 of process 500, food management module 180 generates food inventory 185 associated with user 130. Food inventory 185 includes a variety of food items and the quantities of the food items, which the data utilized to generate food inventory 185 may be sourced from server 120, user behavior module 140, supply chain module 150, consumer platform 160, machine learning module 170, inputs provided by user 130 on the centralized platform, and/or applicable IOT devices associated with user 130 (e.g. smart refrigerators, smart pantries, etc.). As this is a food database, food inventory 185 is a list of food items or other ingredients for making food or meals. Each food item may be associated with its purchase date and/or expiration date, and the food items are organized according to types (e.g. eggs, milk, tomato, fish, salt, sugar, etc.,) allowing food management module 180 to maintain a count of each type of food item. Food management module 180 is configured to update food inventory 185 when user 130 records the purchase of a food item (by e.g. scanning the item's UPC code), or adds the food item to shopping cart 210. In some embodiments, user 130 inputs selections of recipes for consumption into the centralized platform, and food management module 180 automatically subtracts the amount of the respective food items used for each individual recipe from food inventory 185.

At step 520 of process 500, food profile module 190 generates a food profile associated with user 130. The food profile is generated based on data acquired from server 120, user behavior module 140, supply chain module 150, consumer platform 160, machine learning module 170 (outputs of the machine learning models), and/or food management module 180. The food profile includes food inventory 185 which not only includes food items and their respective quantities within the stock of user 130, but also food items that user 130 has added to shopping cart 210. In some embodiments, the food profile includes data derived from predictions, estimations, and other applicable outputs of one or more machine learning models operated by machine learning module 170. For example, a machine learning model may utilize training datasets including food product sales activity, expiration dates of food items, and time point related data in order to output the likelihood of user 130 needing to replenish an item and other applicable analytics associated with food items purchased by user 130. In addition, the food profile includes food preferences (e.g. preferred recipes, preferred ingredients, etc.), allergies/dietary restrictions, level of culinary skill, budget constraints, supply chain constraints, etc.

At step 530 of process 500, food management module 180 tracks food items actively being added to shopping cart 210 by user 130. As food items are being added to shopping cart 210, food management module 180 is continuously adding food recipe data for storage in recipe database 195. In some embodiments, recipes are being added to recipe database 195 based upon one or more of the food items added to shopping cart 210 in addition to food items within food inventory 185. Tracking food items added to shopping cart 210 not only supports food management module 180 determining food shortages within food inventory 185, but also allows food management module 180 to determine which recipes user 130 is able to make in light of both the current and newly added recipes being contributed to shopping cart 210. For example, if user 130 adds cheese to shopping cart 210, food management module 180 may suggest to user 130 via the centralized platform that user 130 has the option to make one or more of a grilled cheese sandwich, macaroni and cheese, cheese soup, etc. based upon the food profile along with current food items in food inventory 185 and shopping cart 210.

At step 540 of process 500, machine learning module 170 generates the Qi and Di of the food items added to shopping cart 210 as outputs of the one or more machine learning models operated by machine learning module 170. In some embodiment, machine learning module 170 receives training datasets from user behavior module 140 and consumer platform 160 including past purchase information associated with the food items in shopping cart 210 in order to not only ascertain the Qi and Di of the food items, but also to ascertain how much of the food items had been used since the last purchase and which recipe of recipe database 195 the food items were used to make. For example, adds a loaf of bread to shopping cart 210 (e.g. 20 slices of bread in a loaf) and the previous purchase information indicates that user 130 bought a loaf then as well, then based on the food profile and food inventory 185 (indicating food inventory 185 has 23 slices of bread including the current loaf in shopping cart 210) machine learning module 170 predicts that 17 slices of bread within food inventory 185 were consumed.

At step 550 of process 500, machine learning module 170 predicts the Ri of user 130. In some embodiments, food management module 180 leverages outputs from the machine learning models and data derived from external data sources (such as web-based grocery ordering and delivery services, etc.) in order to ascertain the Ri. For example, food management module 180 may utilize the aforementioned data sources and outputs, such as Qi and Di of selected food items, in order to identify "Ri"s associated with user 130 by filtering through the recipe database 195 based on food items within food inventory 185.

At step 560 of process 500, food management module 180 utilizes ontology building to construct food ontology 300. The construction of food ontology 300 allows food management module 180 to identify recipe details including, but not limited to steps, ingredients, quantities of ingredients, classifications/collections, cooking methods, favorites, etc. In some embodiments, the centralized platform allows user 130 to query an ontology database associated with food ontology 300, and provides user 130 with the opportunity to populate ontologies with representations, definitions of categories, properties and relations between terms, etc. The inferences derived from machine learning module 170 or inputs of user 130 to the centralized platform regarding recipes of recipe database 195 previously prepared by user 130 are correlated with food ontology 300 in order for machine learning module 170 to utilize one or more estimation models to ascertain one or more absent food items associated with the previously prepared recipes, wherein absent food items pertain to food items not included in shopping cart 210. For example, utilizing an estimation model food management module 180 may identify one or more absent food items associated with a recipe in addition to the respective Qi of each of the one or more absent food items with respect to food inventory 185.

At step 570 of process 500, food management module 180 makes a determination as to whether each food item of Ri associated with user 130 is within shopping cart 210 and/or food inventory 185. If not, then step 575 of process 500 occurs in which machine learning module 170 utilizes one or more estimation models to ascertain the Qi of each of the absent food items, wherein each estimation model includes respective prediction functions, each prediction function specifying the Qi for the one or more absent food items when last purchased by the user in order to ascertain the remaining quantities of food items within food inventory 185. Otherwise, step 580 of process 500 occurs in which machine learning module 170 ascertains the CQi of each of the food items last purchased by user 130 (based on the purchase history).

At step 590 of process 500, the Qi ascertained from step 575 and/or the Cqi ascertained from step 590 is transmitted to supply chain module 150. Supply chain module 150 may utilize the aforementioned data to optimize inventory management at the retailer/distribution stages in the food supply chain, which ultimately assist in reducing the amount of food loss/waste on a global scale.

Figure 6:
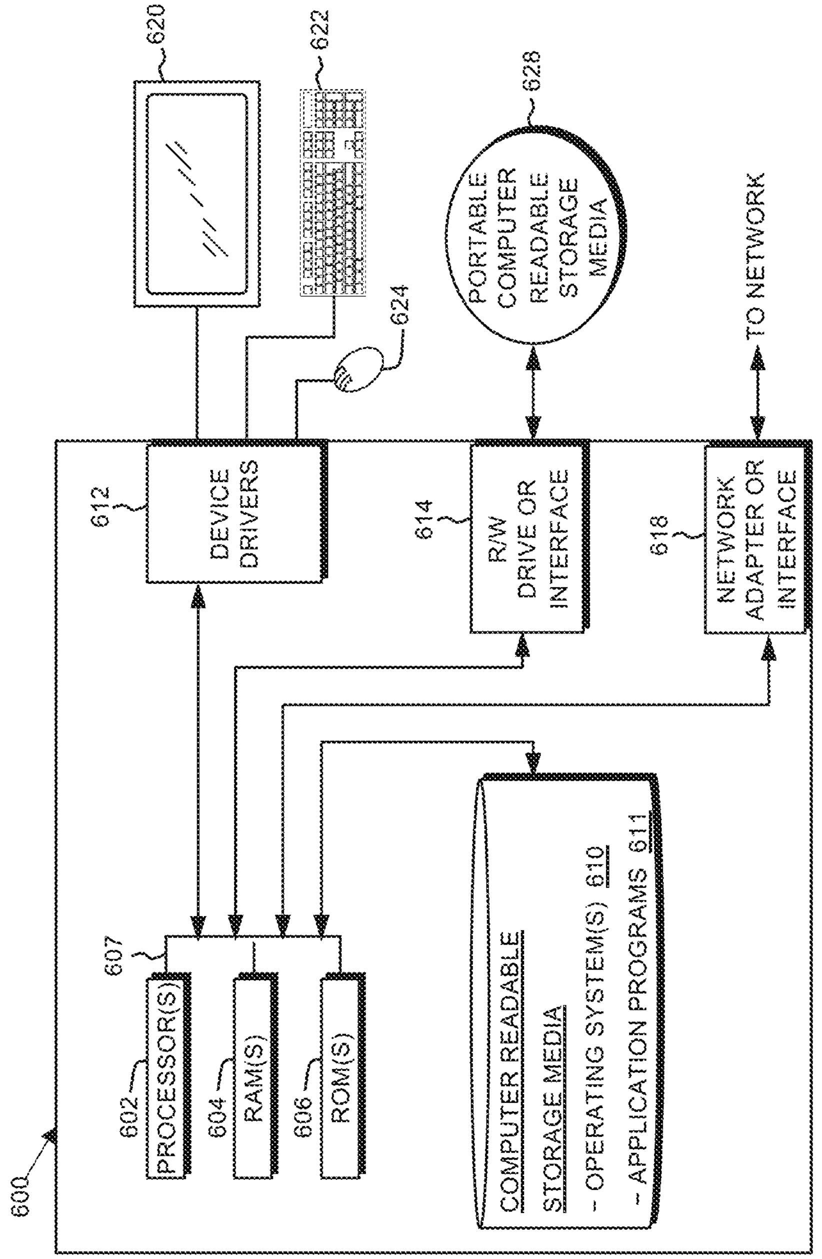
FIG. 6 depicts a block diagram illustrating components of the software application of FIG. 1, in accordance with an embodiment of the invention.

FIG. 6 is a block diagram of components 600 of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 600 is representative of any electronic device capable of executing machine-readable program instructions. Data processing system 600 may be representative of a smart phone, a computer system, PDA, or other electronic devices. Examples of computing systems, environments, and/or configurations that may represented by data processing system 600 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices. The one or more servers may include respective sets of components illustrated in FIG. 6. Each of the sets of components include one or more processors 602, one or more computer-readable RAMs 604 and one or more computer-readable ROMs 606 on one or more buses 607, and one or more operating systems 610 and one or more computer-readable tangible storage devices, such as application program(s) 611. The one or more operating systems 610 may be stored on one or more computer-readable tangible storage devices for execution by one or more processors 602 via one or more RAMs 604 (which typically include cache memory). In the embodiment illustrated in FIG. 6, each of the computer-readable tangible storage devices is a magnetic disk storage device of an internal hard drive. Alternatively, each of the computer-readable tangible storage devices is a semiconductor storage device such as ROM 606, EPROM, flash memory or any other computer-readable tangible storage device that can store a computer program and digital information.

Each set of components 600 also includes a R/W drive or interface 614 to read from and write to one or more portable computer-readable tangible storage devices 628 such as a CD-ROM, DVD, memory stick, magnetic tape, magnetic disk, optical disk or semiconductor storage device. A software program can be stored on one or more of the respective portable computer-readable tangible storage devices 628, read via the respective R/W drive or interface 614 and loaded into the respective hard drive.

Each set of components 600 may also include network adapters (or switch port cards) or interfaces 618 such as a TCP/IP adapter cards, wireless wi-fi interface cards, or 3G or 4G wireless interface cards or other wired or wireless communication links. Applicable software can be downloaded from an external computer (e.g. server) via a network (for example, the Internet, a local area network or other, wide area network) and respective network adapters or interfaces 618. From the network adapters (or switch port adaptors) or interfaces 618, the centralized platform is loaded into the respective hard drive. The network may comprise copper wires, optical fibers, wireless transmission, routers, firewalls, switches, gateway computers and/or edge servers.

Each of components 600 can include a computer display monitor 620, a keyboard 622, and a computer mouse 624. Components 600 can also include touch screens, virtual keyboards, touch pads, pointing devices, and other human interface devices. Each of the sets of components 600 also includes device drivers 612 to interface to computer display monitor 620, keyboard 622 and computer mouse 624. The device drivers 612, R/W drive or interface 614 and network adapter or interface 618 comprise hardware and software (stored in RAM 604 and/or ROM 606).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g. country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g. storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g. web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (Aasax): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g. host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g. mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
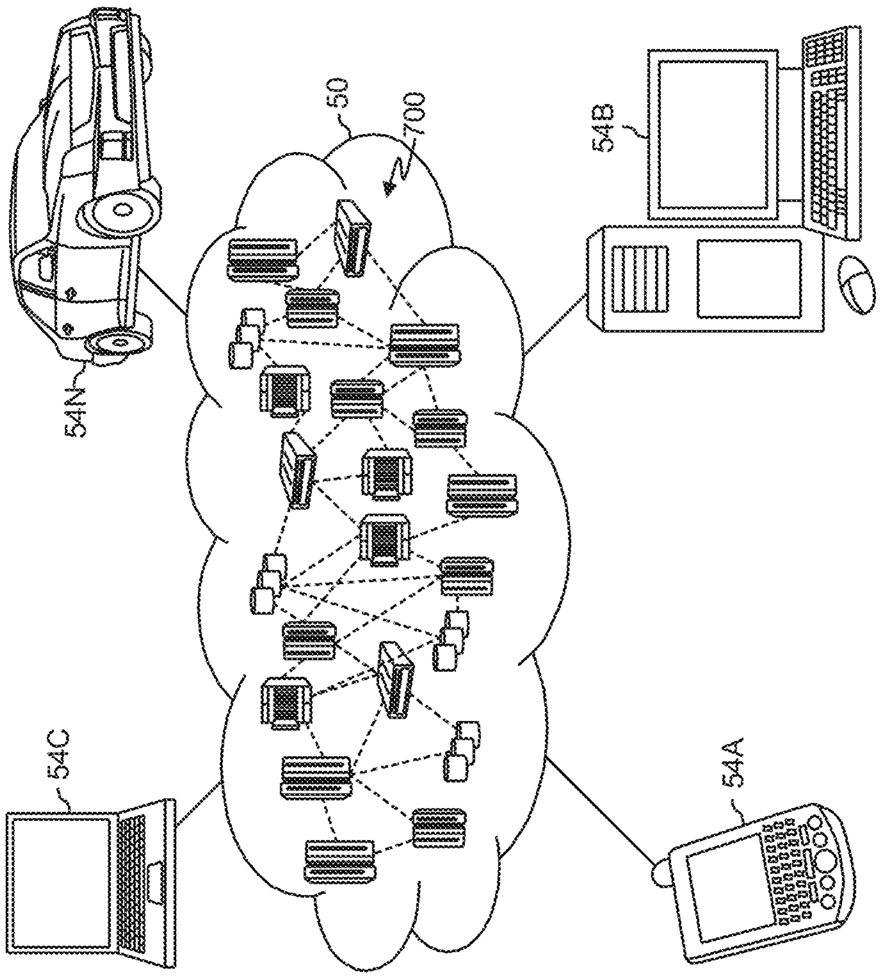
FIG. 7 depicts a cloud-computing environment, in accordance with an embodiment of the present invention.

Referring now to FIG. 7, illustrative cloud computing environment 700 is depicted. As shown, cloud computing environment 700 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-N shown in FIG. 7 are intended to be illustrative only and that computing nodes 50 and cloud computing environment 700 can communicate with any type of computerized device over any type of network and/or network addressable connection (e.g. using a web browser).

Figure 8:
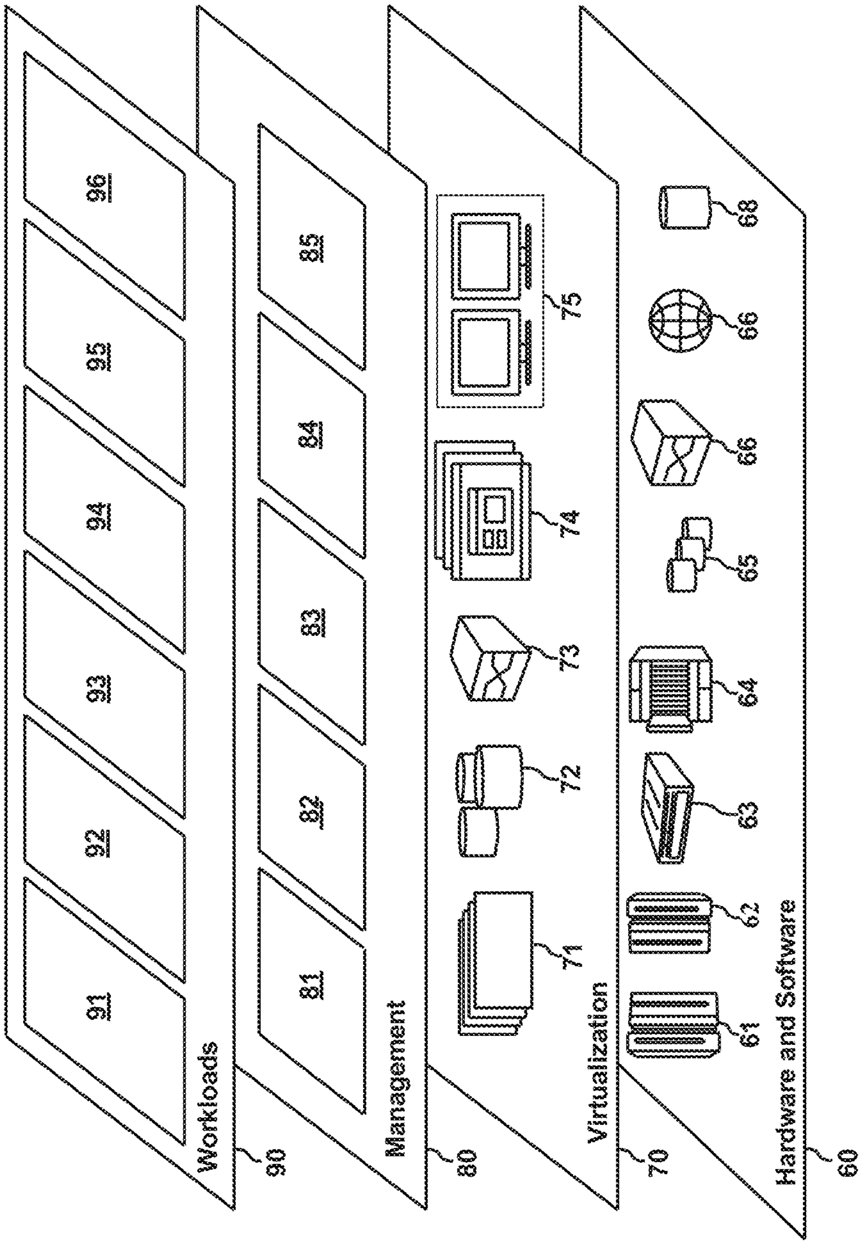
FIG. 8 depicts abstraction model layers, in accordance with an embodiment of the present invention.

Referring now to FIG. 8 a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and food product estimation generation 96. Food product estimation generation 96 relates to generating estimations of food products (e.g., quantities, duration of usage, associated recipes, etc.) associated with one or more food inventories.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for optimizing food personalization comprising:

generating, by a computing device, a food profile based on a food inventory of a user, the food inventory available to the computing device in a computer-accessible form;

identifying, by the computing device, a plurality of food recipes based on the food profile, the plurality of food recipes available in a computer-accessible form;

determining, by the computing device, a plurality of food items associated with the food inventory;

wherein determining the plurality of food items comprises invoking, by the computing device, a machine learning model wherein a plurality of outputs of the machine learning model comprise at least an analysis of the plurality of food items based on scanning, via a plurality of Internet-Of-Things (IOT) sensors communicatively coupled to a shopping cart, the plurality of food items added to the shopping cart by the user via a user interface on the computing device;

wherein the machine learning model outputs a food product quantity and a duration of usage for one or more items of the food inventory;

wherein the machine learning model receives a plurality of training datasets from a user behavior module associated with the user and training the machine learning model comprises including a plurality of external event-related data associated with one or more external events to account for a plurality of food product quantity variances;

wherein the analysis is included in the food profile;

identifying, by the computing device, one or more absent food items associated with the plurality of food recipes from the plurality of food items, the one or more absent food items being absent from the food inventory; and communicating, by the computing device, to the user that the one or more absent food items are absent from the food inventory and at least one food based on the food profile.

2. The computer-implemented method of claim 1, wherein determining the plurality of food items comprises:

invoking, by the computing device, the machine learning model, wherein the machine learning model outputs the food product quantity and the duration of usage for the one or more items of the food inventory;

wherein the machine learning model receives the plurality of training datasets from the user behavior module associated with the user.

3. The computer-implemented method of claim 2, further comprising leveraging the machine learning outputs and the plurality of external event-related data associated with the one or more external events to ascertain at least one food recipe of the plurality of food recipes.

4. The computer-implemented method of claim 1, wherein the generating of the food profile is based further on at least one member selected from the group consisting of past purchase information associated with the user, social media activity associated with the user, and past food recipes associated with the user.

5. The computer-implemented method of claim 1, wherein the identifying the at least one food recipe based on the food profile comprises:

filtering, by the computing device, a plurality of recipes which correspond to the food profile, the filtering comprising the computing device selecting from the plurality of recipes the recipe that is most preferred by the user, wherein the at least one food recipe includes the selected recipe.

6. The computer-implemented method of claim 1, further comprising:

predicting, by the computing device, a desirable quantity of the one or more absent food items, the predicting the desirable quantity comprising:

generating, by the computing device, a recipe ontology based on the at least one food recipe;

determining, by the computing device, a quantity of one or more items in the food inventory;

correlating, by the computing device, the recipe ontology with the quantity of the one or more items in the food inventory to predict the desirable quantity for the one or more absent food items; and communicating, by the computing device, to the user the desirable quantity of the one or more absent food items.

7. The computer-implemented method of claim 2, further comprising:

generating, by the computing device, estimation models for the one or more absent food items by using the machine learning model;

wherein the estimation models include respective prediction functions, each prediction function specifying a quantity for the one or more absent food items when last purchased by the user.

8. The computer-implemented method of claim 6, wherein the predicting the desirable quantity of the one or more absent food items comprises:

predicting, by the computing device, a number of times the at least one food recipe has been cooked by the user within a time interval, the predicting the number of times being based on the determined quantity of the one or more items in the food inventory;

predicting, by the computing device and based on the predicted number of times the at least one food recipe has been cooked and on an acquisition history of the user, an amount of the one or more absent food items that are present in the food inventory for the user; and reducing, by the computing device, the desirable quantity based on the predicted amount of the one or more absent food items that are present in the food inventory for the user.

9. A computer system for optimizing food personalization, the computer system comprising:

one or more processors, one or more computer-readable memories; and program instructions stored on at least one of the one or more computer-readable memories for execution by at least one of the one or more processors, the program instructions comprising:

program instructions to generate a food profile based on a food inventory of a user, the food inventory available to a computing device in a computer-accessible form;

program instructions to identify a plurality of food recipes based on the food profile, the plurality of food recipes available in a computer-accessible form;

program instructions to determine a plurality of food items associated with the food inventory;

wherein the program instructions to determine the plurality of food items comprise program instructions to invoke a machine learning model, wherein a plurality of outputs of the machine learning model comprise at least an analysis of the plurality of food items based on program instructions to scan, via a plurality of Internet-Of-Things (IOT) sensors communicatively coupled to a shopping cart, the plurality of food items added to the shopping cart by the user via a user interface on a computing device;

wherein the machine learning model outputs a food product quantity and a duration of usage for one or more items of the food inventory;

wherein the machine learning model receives a plurality of training datasets from a user behavior module associated with the user and trains the machine learning model utilizing program instructions comprising a plurality of external event-related data associated with one or more external events to account for a plurality of food product quantity variances;

wherein the analysis is included in the food profile;

program instructions to identify one or more absent food items associated with the plurality of food recipes from the plurality of food items, the one or more absent food items being absent from the food inventory; and program instructions to communicate to the user that the one or more absent food items are absent from the food inventory and at least one food based on the food profile.

10. The computer system of claim 9, wherein the program instructions to determine the plurality of food items comprise:

program instructions to invoke the machine learning model, wherein the machine learning model outputs the food product quantity and the duration of usage for the one or more items of the food inventory;

wherein the machine learning model receives the plurality of training datasets from the user behavior module associated with the user.

11. The computer system of claim 9, wherein the program instructions to identify the one or more absent food items comprise:

program instructions to filter a plurality of recipes which correspond to the food profile, the program instructions to filter comprising program instructions to select from the plurality of recipes a recipe that is most preferred by the user, wherein the at least one food recipe includes the selected recipe.

12. The computer system of claim 9, further comprising:

program instructions to predict a desirable quantity of the one or more absent food items, the program instructions to predict the desirable quantity comprising:

program instructions to generate a recipe ontology based on the at least one food recipe;

program instructions to determine a quantity of one or more items in the food inventory;

program instructions to correlate the recipe ontology with the quantity of the one or more items in the food inventory to predict the desirable quantity for the one or more absent food items; and program instructions to communicate to the user the desirable quantity of the one or more absent food items.

13. The computer system of claim 10, further comprising:

program instructions to generate estimation models for the one or more absent food items by using the machine learning model;

wherein the estimation models include respective prediction functions, each prediction function specifying a quantity for the one or more absent food items when last purchased by the user.

14. A computer program product for optimizing food personalization, the computer program product comprising a computer readable storage medium having program instructions embodied therewith, wherein the computer readable storage medium is not a transitory signal per se, the program instructions being executable by a processor to cause the processor to perform a method comprising:

generating a food profile based on a food inventory of a user, the food inventory available to a computing device in a computer-accessible form;

identifying a plurality of food recipes based on the food profile, the plurality of food recipes available in a computer-accessible form;

determining a plurality of food items associated with the food inventory;

wherein determining the plurality of food items comprises invoking a machine learning model, wherein a plurality of outputs of the machine learning model comprise at least an analysis of the plurality of food items based on scanning, via a plurality of Internet-Of-Things (IOT) sensors communicatively coupled to a shopping cart, the plurality of food items added to the shopping cart by the user via a user interface on the computing device;

wherein the machine learning model outputs a food product quantity and a duration of usage for one or more items of the food inventory;

wherein the machine learning model receives a plurality of training datasets from a user behavior module associated with the user and training the machine learning model comprises including a plurality of external event-related data associated with one or more external events to account for a plurality of food product quantity variances;

wherein the analysis is included in the food profile;

identifying one or more absent food items associated with the plurality of food recipes from the plurality of food items, the one or more absent food items being absent from the food inventory; and communicating to the user that the one or more absent food items are absent from the food inventory and at least one food based on the food profile.

15. The computer program product of claim 14, wherein determining the plurality of food items comprises:

invoking the machine learning model, wherein the machine learning model outputs the food product quantity and the duration of usage for one or more items of the food inventory;

wherein the machine learning model receives the plurality of training datasets from the user behavior module associated with the user.

16. The computer program product of claim 14, wherein the identifying the one or more absent food items comprises:

filtering a plurality of recipes which correspond to the food profile, the filtering comprising selecting from the plurality of recipes the recipe that is most preferred by the user, wherein the at least one food recipe includes the selected recipe.

17. The computer program product of claim 14, further comprising:

predicting a desirable quantity of the one or more absent food items, the predicting the desirable quantity comprising:

generating a recipe ontology based on the at least one food recipe;

determining a quantity of one or more items in the food inventory;

correlating the recipe ontology with the quantity of the one or more items in the food inventory to predict the desirable quantity for the one or more absent food items; and communicating to the user the desirable quantity of the one or more absent food items.

18. The computer program product of claim 15, further comprising:

generating estimation models for the one or more absent food items by using the machine learning model;

wherein the estimation models include respective prediction functions, each prediction function specifying a quantity for the one or more absent food items when last purchased by the user.

19. The computer program product of claim 17, wherein the predicting the desirable quantity of the one or more absent food items comprises:

predicting a number of times the at least one food recipe has been cooked by the user within a time interval, the predicting the number of times being based on the determined quantity of the one or more items in the food inventory;

predicting based on the predicted number of times the at least one food recipe has been cooked and on an acquisition history of the user, an amount of the one or more absent food items that are present in the food inventory for the user; and reducing the desirable quantity based on the predicted one or more absent food items that are present in the food inventory for the user.

20. The computer program product of claim 14, wherein the generating of the food profile is based further on at least one member selected from the group consisting of past purchase information associated with the user, social media activity associated with the user, and past food recipes associated with the user.

* * * * *